(12) United States Patent
Morales et al.

(10) Patent No.: US 7,077,440 B1
(45) Date of Patent: Jul. 18, 2006

(54) KNOCKDOWN NERF BAR FOR REPLACEABLY AND ADJUSTABLY PROTECTING A SIDE OF A VEHICLE FROM DINGS AND DENTS

(76) Inventors: Armindo Morales, c/o Velazquez, P.O. Box 140-168, Staten Island, NY (US) 10314; Hernan Cortes, 222 E. 93rd St., Apt. 42-F, New York, NY (US) 10128-3763

( * ) Notice: Subject to any disclaimer, the term of this patent is extended or adjusted under 35 U.S.C. 154(b) by 0 days.

(21) Appl. No.: 10/962,242

(22) Filed: Oct. 8, 2004

(51) Int. Cl.
    *B60R 19/42* (2006.01)
(52) U.S. Cl. ........................... 293/128; 293/127
(58) Field of Classification Search ......... 296/128, 296/126, 146
    See application file for complete search history.

(56) References Cited

U.S. PATENT DOCUMENTS

| | | | | |
|---|---|---|---|---|
| 1,523,978 | A * | 1/1925 | Rougeot | 293/128 |
| 1,708,804 | A * | 4/1929 | Schulman | 293/128 |
| 1,753,483 | A | 4/1930 | Stevens | |
| 2,512,527 | A * | 6/1950 | Hoffman | 293/128 |
| 3,596,962 | A * | 8/1971 | Hertzell | 293/128 |
| 3,718,357 | A * | 2/1973 | Hertzell | 293/128 |
| 4,025,098 | A * | 5/1977 | Powaska | 293/128 |
| 4,217,715 | A * | 8/1980 | Bryan, Jr. | 293/128 |
| 4,221,410 | A * | 9/1980 | Dawson | 293/21 |
| 4,437,697 | A * | 3/1984 | Hinojos | 293/128 |
| 4,674,783 | A * | 6/1987 | Hogan, III | 293/128 |
| 4,726,614 | A | 2/1988 | Myers et al. | |
| 4,943,085 | A * | 7/1990 | Straka | 293/128 |
| 4,974,892 | A | 12/1990 | Huard | |
| 4,993,765 | A * | 2/1991 | Ryan | 293/127 |
| 5,333,923 | A * | 8/1994 | Whitfield | 293/128 |
| 5,421,625 | A * | 6/1995 | Arko | 293/128 |
| 5,518,283 | A * | 5/1996 | Egelske | 293/128 |
| 5,879,037 | A | 3/1999 | Batiste | |
| 5,961,137 | A * | 10/1999 | Knight | 280/160 |
| 6,263,996 | B1 * | 7/2001 | Welch | 180/271 |
| 6,536,790 | B1 * | 3/2003 | Ojanen | 280/163 |
| 6,726,230 | B1 * | 4/2004 | Weir | 280/163 |
| 6,893,079 | B1 * | 5/2005 | Johnson et al. | 293/128 |
| 2003/0178805 | A1 * | 9/2003 | Elrod | 280/163 |
| 2005/0104390 | A1 * | 5/2005 | Norelius | 293/128 |

* cited by examiner

Primary Examiner—Kiran B. Patel
(74) Attorney, Agent, or Firm—Richard L. Miller

(57) ABSTRACT

A knockdown nerf bar for replaceably and adjustably protecting a side of a vehicle from dings and dents. A frame replaceably and adjustably mounts to the vehicle. Mounting apparatus is operatively connected to the frame and mounts the frame to the vehicle. Adjusting apparatus is operatively connected to the frame and replaceably and adjustably attaches the frame to the vehicle. The frame has a pair of subframes connected to each other by a plurality of transverse portions that extend horizontally across the side of the vehicle. Each subframe has a stationary portion and a movable portion. The stationary portion mounts to, and extends outwardly from, the underside of the vehicle by the mounting apparatus. The movable portion is replaceably and adjustably connected to the stationary portion by the adjusting apparatus and extends vertically along the side of the vehicle. The mounting apparatus attaches to the underside of, and the panel flange of the underside of, the vehicle.

45 Claims, 3 Drawing Sheets

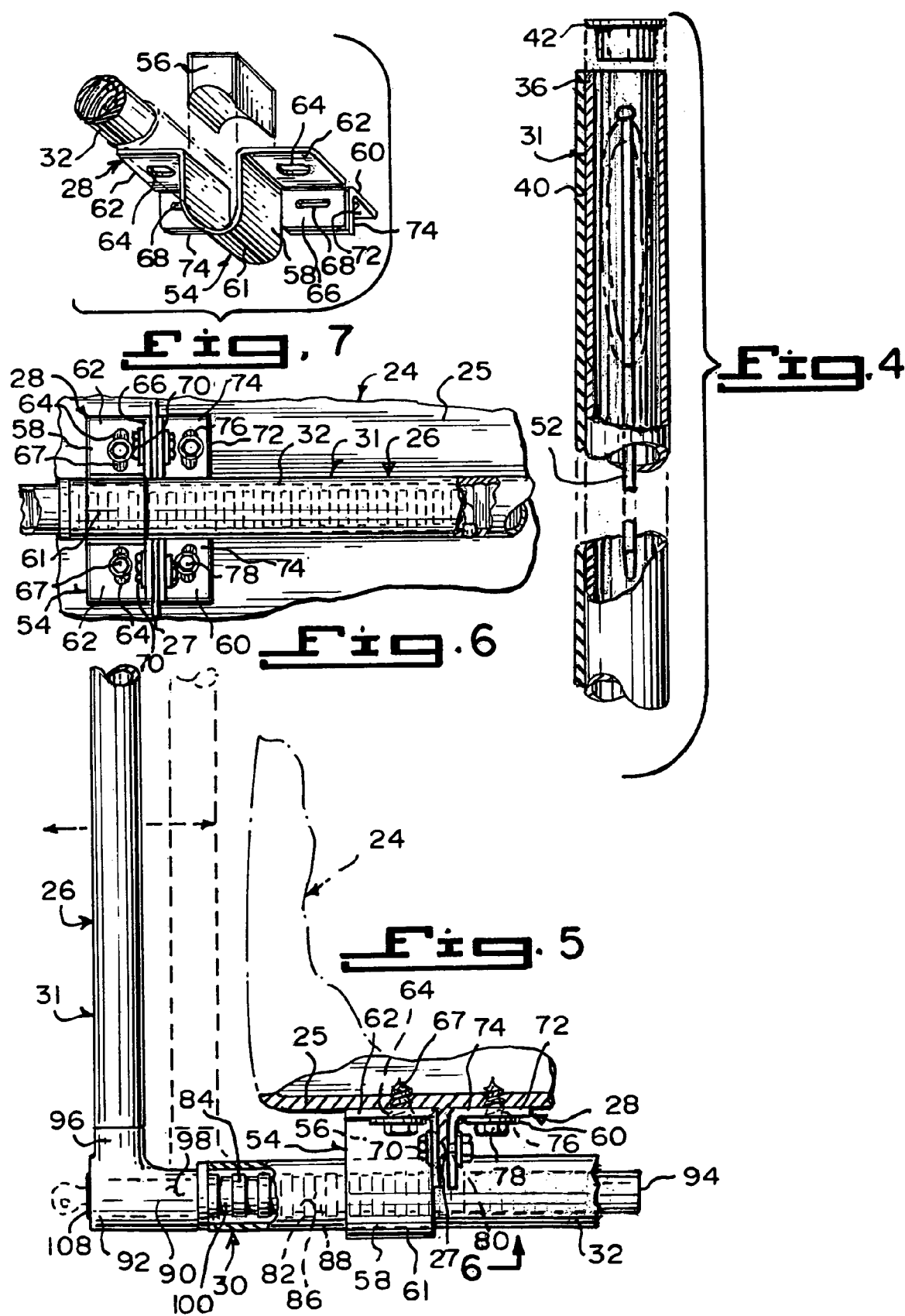

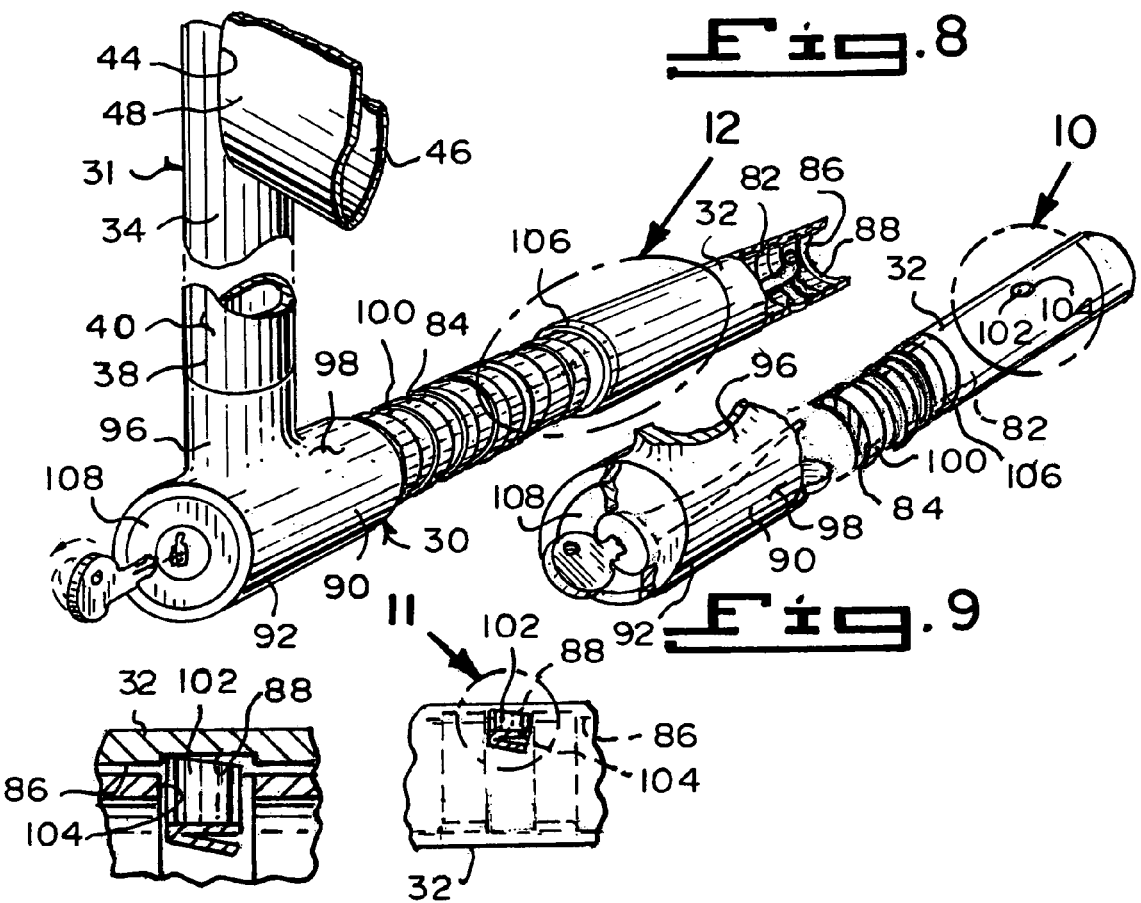
Fig. 8
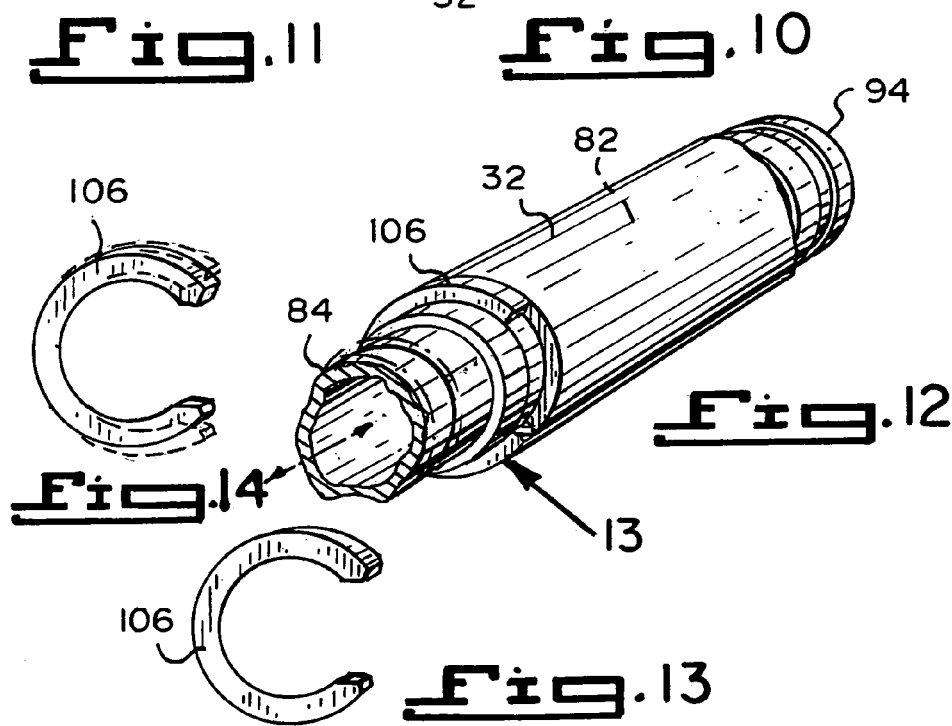
Fig. 9
Fig. 10
Fig. 11
Fig. 12
Fig. 13
Fig. 14

KNOCKDOWN NERF BAR FOR REPLACEABLY AND ADJUSTABLY PROTECTING A SIDE OF A VEHICLE FROM DINGS AND DENTS

BACKGROUND OF THE INVENTION

1. Field of the Invention

The present invention relates to a nerf bar, and more particularly, the present invention relates to a knockdown nerf bar for replaceably and adjustably protecting a side of a vehicle from dings and dents.

2. Description of the Prior Art

Numerous innovations for vehicle side ding and dent protectors have been provided in the prior art that will be described. Even though these innovations may be suitable for the specific individual purposes to which they address, however, they differ from the present invention.

A FIRST EXAMPLE, U.S. Pat. No. 1,523,978 to Rougeot teaches a bumper and a running board of an automobile. The bumper has a portion slidably resting upon the upper surface of the running board.

A SECOND EXAMPLE, U.S. Pat. No. 1,708,804 to Schulman teaches a bumper disposed along the side of a vehicle. Apparatus moves the bumper out of the way to permit egress from the vehicle.

A THIRD EXAMPLE, U.S. Pat. No. 1,753,483 to Stevens teaches a non-resilient bumper member supported rigidly from the chassis and sloping rearwardly from each side of a central point to a point outside of the wheels and a circular member resilient per se supported upon a vertical axis, of the bumper member, with its forward periphery in advance of the forward, central point of the front member.

A FOURTH EXAMPLE, U.S. Pat. No. 3,596,962 to Hertzell teaches a bumper guard assembly apparatus to be attached to an automobile comprising a bumper guard and means to move the bumper guard in one direction when the apparatus is in use and in an opposite direction when the apparatus is not in use, whereby the same need not be completely detached from the automobile at any time.

A FIFTH EXAMPLE, U.S. Pat. No. 3,718,357 to Hertzell teaches a bumper guard assembly apparatus to be attached to an automobile comprising a bumper guard and means to move the bumper guard in one direction when the apparatus is in use and in an opposite direction when the apparatus is not in use, whereby the same need not be completely detached from the automobile at any time.

A SIXTH EXAMPLE, U.S. Pat. No. 4,726,614 to Myers et al. teaches a vehicle body panel protector bumper comprising semi-flexible tubular members having base sides with magnets for mounting in a selected position on a body panel, with a lengthwise adjustable security tab for attachment to a door edge and connected by a flexible hinge-connector strap for convenient mounting, dismounting, and storage.

A SEVENTH EXAMPLE, U.S. Pat. No. 4,974,892 to Huard teaches a protective automotive guard for securement to an automotive door panel and the like for protection against impact from adjacent vehicles. The guard includes a matrix of rods securable to the door utilizing various devices, such as magnetic tape, double faced tape, and suction cups. A further embodiment of the device utilizes removable rods for replacement subsequent to their damage. A third embodiment of the device includes an alarm for alerting an adjacent vehicle if impact with the automotive guard.

AN EIGHTH EXAMPLE, U.S. Pat. No. 5,879,037 to Batiste teaches an elongated, tubular shaped plastic case housing with an attached opening door and its mounting retains an elongated impact absorbing pad and its inner retracting cord mechanism. Pad when placed on a vehicle works as a barrier between a vehicle door being struck and the other striking. Magnets inside pad attracts pad to vehicle panels.

It is apparent that numerous innovations for vehicle side ding protectors have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a knockdown nerf bar for replaceably and adjustably protecting a side of a vehicle from dings and dents that avoids the disadvantages of the prior art.

ANOTHER OBJECT of the present invention is to provide a knockdown nerf bar for replaceably and adjustably protecting a side of a vehicle from dings and dents that is simple to use.

BRIEFLY STATED, STILL ANOTHER OBJECT of the present invention is to provide a knockdown nerf bar for replaceably and adjustably protecting a side of a vehicle from dings and dents. A frame replaceably and adjustably mounts to the vehicle. Mounting apparatus is operatively connected to the frame and mounts the frame to the vehicle. Adjusting apparatus is operatively connected to the frame and replaceably and adjustably attaches the frame to the vehicle. The frame has a pair of subframes connected to each other by a plurality of transverse portions that extend horizontally across the side of the vehicle. Each subframe has a stationary portion and a movable portion. The stationary portion mounts to, and extends outwardly from, the underside of the vehicle by the mounting apparatus. The movable portion is replaceably and adjustably connected to the stationary portion by the adjusting apparatus and extends vertically along the side of the vehicle. The mounting apparatus attaches to the underside of, and the panel flange of the underside of, the vehicle.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows:

FIG. 4 is a diagrammatic cross sectional view, with parts broken away, taken along LINE 4—4 in FIG. 3 of the upper portion of the vertical portion of the frame of the knockdown nerf bar of the present invention;

FIG. 5 is an enlarged diagrammatic side elevational view, partially in section and with parts broken away taken in the direction of ARROW 5 in FIG. 2 of a lower portion of the vertical portion of the frame of the knockdown nerf bar of the present invention;

FIG. 6 is a diagrammatic bottom elevational view with parts broken away taken generally in the direction of ARROW 6 in FIG. 5;

FIG. 7 is an enlarged diagrammatic exploded perspective view, with parts broken away of the area generally enclosed by the dotted curve identified by ARROW 7 in FIG. 2 of a mounting apparatus for the knockdown nerf bar of the present invention;

FIG. 8 is a diagrammatic perspective view, with parts broken away, of the area generally enclosed by the dotted curve identified by ARROW 8 in FIG. 2 of an adjusting apparatus of the knockdown nerf bar of the present invention;

FIG. 9 is a diagrammatic fragmentary partial perspective view of a portion of FIG. 8 of a locking apparatus of the adjusting apparatus of the knockdown nerf bar of the present invention;

FIG. 10 is an enlarged diagrammatic cross sectional view, with parts shown in phantom, of the area generally enclosed by the dotted curve identified by ARROW 10 in FIG. 9 of a pawl of the locking apparatus of the adjusting apparatus of the knockdown nerf bar of the present invention;

FIG. 11 is an further enlarged diagrammatic cross sectional view of the area generally enclosed by the dotted curve identified by ARROW 11 in FIG. 10 of the pawl of the locking apparatus of the adjusting apparatus of the knockdown nerf bar of the present invention;

FIG. 12 is an enlarged diagrammatic perspective view of the area generally enclosed by the dotted curve identified by ARROW 12 in FIG. 8 of a stop of the adjusting apparatus of the knockdown nerf bar of the present invention;

FIG. 13 is a diagrammatic perspective view of the flexible snap C-ring of the stop of the adjusting apparatus of the knockdown nerf bar of the present invention identified by ARROW 13 in FIG. 12 in a normal non-deformed state; and FIG. 14 is a diagrammatic perspective view of the flexible snap C-ring of the stop of the adjusting apparatus of the knockdown nerf bar of the present invention shown in FIG. 13 in a deformed state.

Figure 1:
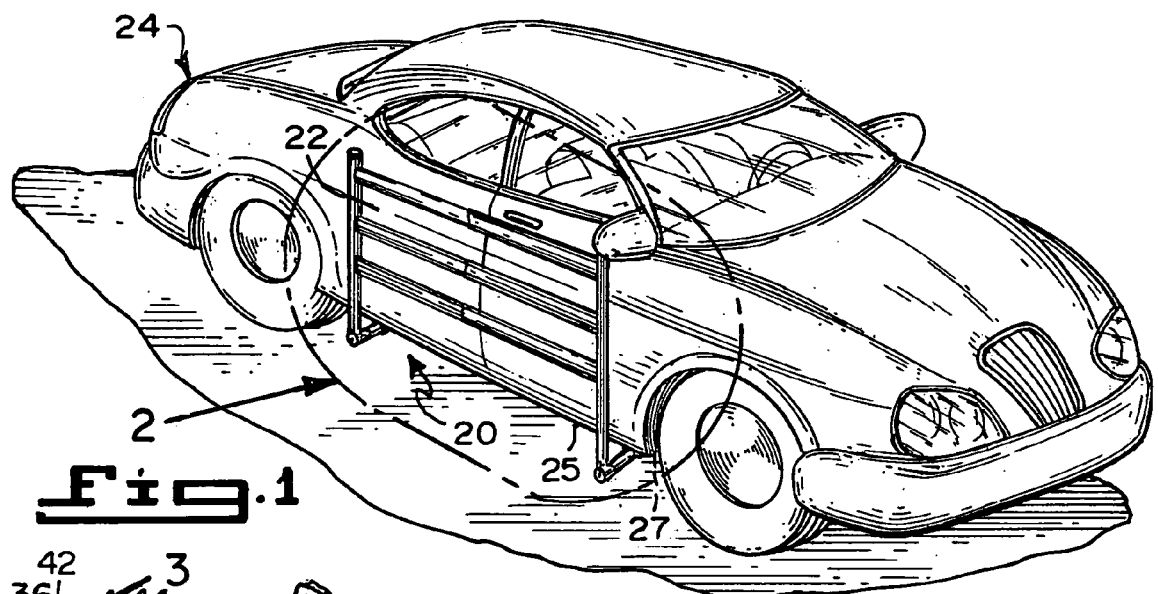
FIG. 1 is a diagrammatic perspective view showing the knockdown nerf bar of the present invention replaceably and adjustably protecting a side of a vehicle from dings and dents.

LIST OF REFERENCE NUMERALS UTILIZED IN THE DRAWING 20 knockdown nerf bar of present invention for replaceably and adjustably protecting side 22 of vehicle 24 from dings
22 side of vehicle 24
24 vehicle
25 underside of vehicle 24
26 frame for replaceably and adjustably mounting to vehicle 24
27 panel flange of underside 25 of vehicle 24
28 mounting apparatus for mounting frame 26 to vehicle 24
30 adjusting apparatus for replaceably and adjustably attaching frame 26 to vehicle 24

-continued

LIST OF REFERENCE NUMERALS UTILIZED IN THE DRAWING 31 pair of subframes of frame 26
32 stationary portion of each subframe of pair of subframes 31 of frame 26 for mounting to, and for extending outwardly from, underside 25 of vehicle 24
34 movable portion of each subframe of pair of subframes 31 of frame 26 for extending vertically along side 22 of vehicle 24
36 uppermost end of movable portion 34 of each subframe of pair of subframes 31 of frame 26
38 lowermost end of movable portion 34 of each subframe of pair of subframes 31 of frame 26
40 longitudinal surface of movable portion 34 of each subframe of pair of subframes 31 of frame 26
42 cap of movable portion 34 of each subframe of pair of subframes 31 of frame 26
44 plurality of slots in movable portion 34 of each subframe of pair of subframes 31 of frame 26
46 plurality of transverse portions of frame 26 for extending horizontally across side 22 of vehicle 24
48 pair of ends of each transverse portion of plurality of transverse portions 46 of frame 26
50 through bore through each end of pair of ends 48 of each transverse portion of plurality of transverse potions 46 of frame 26
52 rod of each subframe of pair of subframes 31 of frame 26
54 bracket of mounting apparatus 28 for attaching to underside 25 of vehicle 24 for affixing stationary portion 32 of associated subframe of pair of subframes 31 of frame 26 to underside 25 of vehicle 24
56 filler of mounting apparatus 28 for eliminating play between stationary portion of associated subframe of pair of subframes 31 of frame 26 and underside 25 of vehicle 24
58 outer portion of bracket 54 of mounting apparatus 28
60 inner portion of bracket 54 of mounting apparatus 28
61 generally U-shaped portion of outer portion 58 of bracket 54 of mounting apparatus 28
62 pair of primary flanges of outer portion 58 of bracket 54 of mounting apparatus 28 for attaching to underside 25 of vehicle 24
64 through bores through pair of primary flanges 62 of outer portion 58 of bracket 54 of mounting apparatus 28, respectively
66 pair of secondary flanges of outer portion 58 of bracket 54 of mounting apparatus 28 for attaching to panel flange 27 of underside 25 of vehicle 24
67 screws for attaching outer portion 58 of bracket 54 of mounting apparatus 28 to underside 25 of vehicle 24
68 through bores through pair of secondary flanges 66 of outer portion 58 of bracket 54 of mounting apparatus 28, respectively
70 bolts for attaching outer portion 58 of bracket 54 of mounting apparatus 28 to panel flange 27 of underside 25 of vehicle 24
72 main portion of inner portion 60 of bracket 54 of mounting apparatus 28 for attaching to underside 25 of vehicle 24
74 pair of flanges of inner portion 60 of bracket 54 of mounting apparatus 28 for attaching to panel flange 27 of underside 25 of vehicle 24
76 through bores through main portion 72 of inner portion 60 of bracket 54 of mounting apparatus 28
78 screws for attaching inner portion 60 of bracket 54 of mounting apparatus to underside 25 of vehicle 24
80 through bores through pair of flanges 74 of inner portion 60 of bracket 54 of mounting apparatus 28, respectively
82 female portion of adjusting apparatus 30
84 male portion of adjusting apparatus 30
86 interior surface of stationary portion 32 of each subframe of pair of subframes 31 of frame 26
88 annular grooves in interior surface 86 of stationary portion 32 of each subframe of pair of subframes 31 of frame 26
90 body of male portion 84 of adjusting apparatus 30
92 proximal end of body 90 of male portion 84 of adjusting apparatus 30
94 distal end of body 90 of male portion 84 of adjusting apparatus 30
96 arm on proximal end 92 of body 90 of male portion 84 of adjusting apparatus 30
98 outer surface of body 90 of male portion 84 of adjusting apparatus 30
100 consecutive annular rings on outer surface 98 of body 90 of male portion 84 of adjusting apparatus 30
102 spring-loaded button of adjusting apparatus 30

-continued

LIST OF REFERENCE NUMERALS UTILIZED IN THE DRAWING 104   through bore through distal end 94 of body 90 of male portion 84 of adjusting apparatus 30
106   flexible snap C-ring of adjusting apparatus 30
108   lock of adjusting apparatus 30

DETAILED DESCRIPTION OF THE PREFERRED EMBODIMENT

Referring now to the figures, in which like numerals indicate like parts, and particularly to FIG. 1, which is a diagrammatic perspective view of the knockdown nerf bar of the present invention replaceably protecting a side of a vehicle from dings and dents, the knockdown nerf bar of the present invention is shown generally at 20 for replaceably and adjustably protecting a side 22 of a vehicle 24 from dings and dents, wherein the vehicle 24 has an underside 25 with a panel flange 27.

The general configuration of the knockdown nerf bar 20 can best be seen in FIG. 2, which is an enlarged diagrammatic perspective view of the area generally enclosed by ARROW 2 in FIG. 1 of the knockdown nerf bar of the present invention and a portion of a side of a vehicle, and as such, will be discussed with reference thereto.

The knockdown nerf bar 20 comprises a frame 26, mounting apparatus 28, and adjusting apparatus 30. The frame 26 is for replaceably and adjustably mounting to the vehicle 24. The mounting apparatus 28 is operatively connected to the frame 26 and is for mounting the frame 26 to the vehicle 24. The adjusting apparatus 30 is operatively connected to the frame 26 and is for replaceably and adjustably attaching the frame 26 to the vehicle 24.

Figure 2:
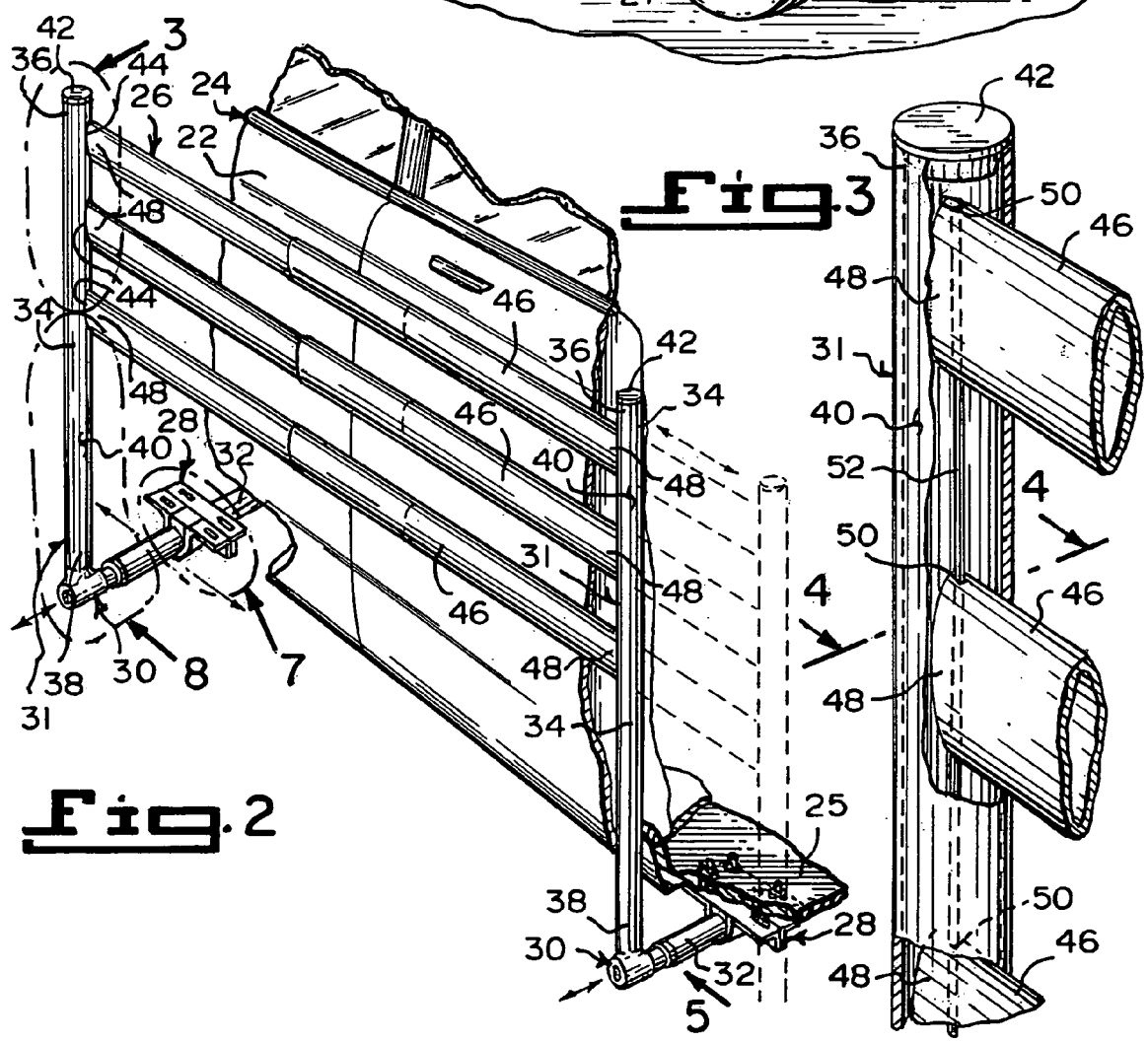
FIG. 2 is an enlarged diagrammatic perspective view of the area generally enclosed by ARROW 2 in FIG. 1 of the knockdown nerf bar of the present invention and a portion of a side of a vehicle.
Figure 3:
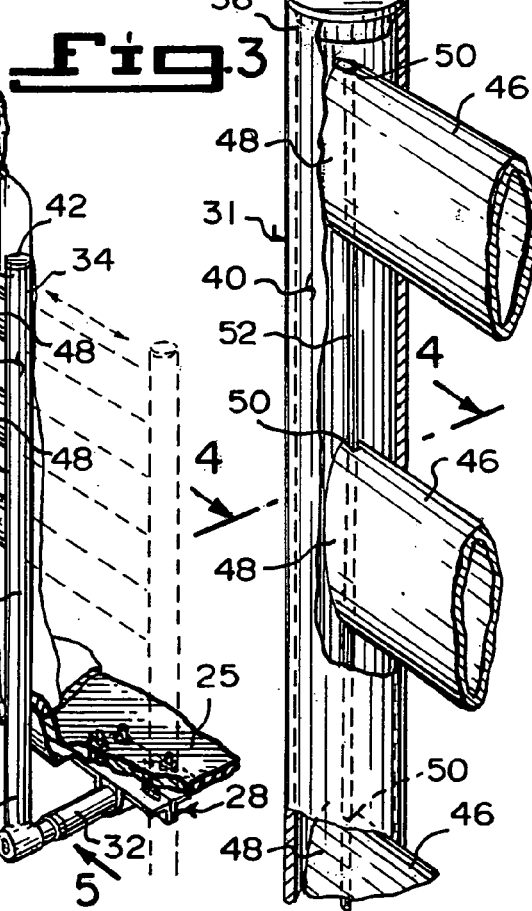
FIG. 3 is an enlarged diagrammatic perspective view, with parts broken away, of the area generally enclosed by the dotted curve identified by ARROW 3 in FIG. 2 of an upper portion of a vertical portion of the frame of the knockdown nerf bar of the present invention.

The specific configuration of the frame 26 can best be seen in FIGS. 2–4, which are, respectively, an enlarged diagrammatic perspective view of the area generally enclosed by ARROW 2 in FIG. 1 of the knockdown nerf bar of the present invention and a portion of a side of a vehicle, an enlarged diagrammatic perspective view, with parts broken away, of the area generally enclosed by the dotted curve identified by ARROW 3 in FIG. 2 of an upper portion of a vertical portion of the frame of the knockdown nerf bar of the present invention, and a diagrammatic cross sectional view, with parts broken away, taken along LINE 4—4 in FIG. 3 of the upper portion of the vertical portion of the frame of the knockdown nerf bar of the present invention, and as such, will be discussed with reference thereto.

The frame 26 comprises a pair of subframes 31.

Each subframe 31 of the frame 26 comprises a stationary portion 32 and a movable portion 34. The stationary portion 32 of each subframe 31 of the frame 26 is for mounting to, and for extending outwardly from, the underside 25 of the vehicle 24 by the mounting apparatus 28.

The movable portion 34 of each subframe 31 of the frame 26 is replaceably and adjustably connected to the stationary portion 32 of an associated subframes 31 of the frame 26 by the adjusting apparatus 30 and for extending vertically along the side 22 of the vehicle 24.

The stationary portion 32 of each subframe 31 of the frame 26 is tubular and horizontally-oriented.

The movable portion 34 of each subframe 31 of the frame 26 is tubular and vertically-oriented.

The movable portion 34 of each subframe 31 of the frame 26 has an uppermost end 36 that is open, a lowermost end 38, and a longitudinal surface 40.

The movable portion 34 of each subframe 31 of the frame 26 further has a cap 42. The cap 42 of the movable portion 34 of each subframe 31 of the frame 26 replaceably closes the uppermost end 36 of the movable portion 34 of an associated subframe 31 of the frame 26.

The movable portion 34 of each subframe 31 of the frame 26 further has a plurality of slots 44. The plurality of slots 44 of the movable portion 34 of each subframe 31 of the frame 26 are vertically-oriented, vertically spaced-apart from each other, and extend through the longitudinal surface 40 of the movable portion 34 of an associated subframe 31 of the frame 26.

The frame 26 further comprises a plurality of transverse portions 46. The plurality of transverse portions 46 of the frame 26 extend from one subframe 31 of the frame 26 to the other subframe 31 of the frame 26 and are for extending horizontally across the side 22 of the vehicle 24.

Each transverse portion 46 of the frame 26 is telescopically formed so as to be length adjustable and has a pair of ends 48.

Each end 48 of each transverse portion 46 of the frame 26 has a through bore 50. The through bore 50 through each end 48 of each transverse portion 46 of the frame 26 is vertically-oriented and vertically-aligned with the through bore 50 through an adjacent end 48 of the ends 48 of the plurality of transverse portions 46 of the frame 26.

Each set of adjacent ends 48 of the plurality of transverse portion 46 of the frame 26 are received in the plurality of slots 44 in the movable portion 34 of an associated subframe 31 of the frame 26 and are maintained thereat by a rod 52.

The rod 52 extends through the through bores 50 in each associated set of adjacent ends 48 of the plurality of transverse portions 46 of the frame 26 once the plurality of transverse portions 46 of the frame 26 have been received in the plurality of slots 44 in the movable portion 34 of an associated subframe 31 of the frame 26 by removing the cap 42 of the movable portion 34 of the associated subframe 31 of the frame 26.

The specific configuration of the mounting apparatus 28 can best be seen in FIGS. 5–7, which are, respectively, an enlarged diagrammatic side elevational view, partially in section and with parts broken away taken in the direction of ARROW 5 in FIG. 2 of a lower portion of the vertical portion of the frame of the knockdown nerf bar of the present invention, a diagrammatic bottom elevational view with parts broken away taken generally in the direction of ARROW 6 in FIG. 5, and an enlarged diagrammatic exploded perspective view, with parts broken away of the area generally enclosed by the dotted curve identified by ARROW 7 in FIG. 2 of a mounting apparatus for the knockdown nerf bar of the present invention, and as such, will be discussed with reference thereto.

The mounting apparatus 28 comprises a bracket 54 and a filler 56. The bracket 54 of the mounting apparatus 28 captures the stationary portion 32 of an associated subframe 31 of the frame 26, and is for attaching to the underside 25 of the vehicle 24 for affixing the stationary portion 32 of an associated subframe 31 of the frame 26 to the underside 25 of the vehicle 24.

The bracket 54 of the mounting apparatus 28 comprises an outer portion 58 and an inner portion 60. The outer portion 58 of the bracket 54 of the mounting apparatus 28 has a generally U-shaped portion 61 and a pair of primary flanges 62. The pair of primary flanges 62 of the outer portion 58 of the bracket 54 of the mounting apparatus 28 extend outwardly from opposing sides of the generally U-shaped portion 61 of the outer portion 58 of the bracket 54 of the mounting apparatus 28 and are for attaching to the underside 25 of the vehicle 24.

The stationary portion 32 of an associated subframe 31 of the frame 26 is captured in the generally U-shaped portion 61 of the outer portion 58 of the bracket 54 of the mounting apparatus 28 and is topped off by the filler 56 of the mounting apparatus 28 for eliminating play between the stationary portion 32 of an associated subframe 31 of the frame 26 and the underside 25 of the vehicle 24.

The pair of primary flanges 62 of the outer portion 58 of the bracket 54 of the mounting apparatus 28 have through bores 64, respectively. The through bores 64 through the pair of primary flanges 62 of the outer portion 58 of the bracket 54 of the mounting apparatus 28, respectively, receive screws 67, respectively, for attaching the outer portion 58 of the bracket 54 of the mounting apparatus 28 to the underside 25 of the vehicle 24.

The outer portion 58 of the bracket 54 of the mounting apparatus 28 further has a pair of secondary flanges 66. The pair of secondary flanges 66 of the outer portion 58 of the bracket 54 of the mounting apparatus 28 depend from the pair of primary flanges 62 of the outer portion 58 of the bracket 54 of the mounting apparatus 28, respectively, and are for attaching to the panel flange 27 of the underside 25 of the vehicle 24.

The pair of secondary flanges 66 of the outer portion 58 of the bracket 54 of the mounting apparatus 28 have through bores 68, respectively. The through bores 68 through the pair of secondary flanges 66 of the outer portion 58 of the bracket 54 of the mounting apparatus 28, respectively, receive bolts 70, respectively, for attaching the outer portion 58 of the bracket 54 of the mounting apparatus 28 to the panel flange 27 of the underside 25 of the vehicle 24.

The inner portion 60 of the bracket 54 of the mounting apparatus 28 has a main portion 72 and a pair of flanges 74. The main portion 72 of the inner portion 60 of the bracket 54 of the mounting apparatus 28 are for attaching to the underside 25 of the vehicle 24.

The pair of flanges 74 of the inner portion 60 of the bracket 54 of the mounting apparatus 28 depend from opposing sides of the main portion 72 of the inner portion 60 of the bracket 54 of the mounting apparatus 28 and are for attaching to the panel flange 27 of the underside 25 of the vehicle 24.

The main portion 72 of the inner portion 60 of the bracket 54 of the mounting apparatus 28 has through bores 76. The through bores 76 through the main portion 72 of the inner portion 60 of the bracket 54 of the mounting apparatus 28 receive screws 78, respectively, for attaching the inner portion 60 of the bracket 54 of the mounting apparatus 28 to the underside 25 of the vehicle 24.

The pair of flanges 74 of the inner portion 60 of the bracket 54 of the mounting apparatus 28 have through bores 80, respectively. The through bores 80 through the pair of flanges 74 of the inner portion 60 of the bracket 54 of the mounting apparatus 28, respectively, receive the bolts 70, respectively, for attaching the inner portion 60 of the bracket 54 of the mounting apparatus 28 to the panel flange 27 of the underside 25 of the vehicle 24, with the panel flange 27 of the underside 25 of the vehicle 24 being sandwiched between the pair of flanges 74 of the inner portion 60 of the bracket 54 of the mounting apparatus 28 and the pair of secondary flanges 66 of the outer portion 58 of the bracket 54 of the mounting apparatus 28.

The specific configuration of the adjusting apparatus 30 can best be seen in FIGS. 5 and 8–14, which are, respectively, an enlarged diagrammatic side elevational view, partially in section and with parts broken away taken in the direction of ARROW 5 in FIG. 2 of a lower portion of the vertical portion of the frame of the knockdown nerf bar of the present invention, a diagrammatic perspective view, with parts broken away, of the area generally enclosed by the dotted curve identified by ARROW 8 in FIG. 2 of an adjusting apparatus of the knockdown nerf bar of the present invention, a diagrammatic fragmentary partial perspective view of a portion of FIG. 8 of a locking apparatus of the adjusting apparatus of the knockdown nerf bar of the present invention, an enlarged diagrammatic cross sectional view, with parts shown in phantom, of the area generally enclosed by the dotted curve identified by ARROW 10 in FIG. 9 of a pawl of the locking apparatus of the adjusting apparatus of the knockdown nerf bar of the present invention, an further enlarged diagrammatic cross sectional view of the area generally enclosed by the dotted curve identified by ARROW 11 in FIG. 10 of the pawl of the locking apparatus of the adjusting apparatus of the knockdown nerf bar of the present invention, an enlarged diagrammatic perspective view of the area generally enclosed by the dotted curve identified by ARROW 12 in FIG. 8 of a stop of the adjusting apparatus of the knockdown nerf bar of the present invention, a diagrammatic perspective view of the flexible snap C-ring of the stop of the adjusting apparatus of the knockdown nerf bar of the present invention identified by ARROW 13 in FIG. 12 in a normal non-deformed state, and a diagrammatic perspective view of the flexible snap C-ring of the stop of the adjusting apparatus of the knockdown nerf bar of the present invention shown in FIG. 13 in a deformed state, and as such, will be discussed with reference thereto.

The adjusting apparatus 30 comprises a female portion 82 and a male portion 84. The female portion 82 of the adjusting apparatus 30 comprises the stationary portion 32 of each subframe 31 of the frame 26 having an interior surface 86 with consecutive annular grooves 88 extending longitudinally therealong and spaced-apart.

The male portion 84 of the adjusting apparatus 30 comprises a body 90. The body 90 of the male portion 84 of the adjusting apparatus 30 has a proximal end 92 and a distal end 94.

The body 90 of the male portion 84 of the adjusting apparatus 30 is tubular and horizontally-oriented.

The proximal end 92 of the body 90 of the male portion 84 of the adjusting apparatus 30 has an arm 96. The arm 96 of the proximal end 92 of the body 90 of the male portion 84 of the adjusting apparatus 30 extends vertically upwardly from the body 90 of the male portion 84 of the adjusting apparatus 30 and is replaceably received in the movable portion 34 of an associated subframe 31 of the frame 26.

The body 90 of the male portion 84 of the adjusting apparatus 30 has an outer surface 98 with consecutive annular rings 100 extending longitudinally therealong and spaced-apart. The consecutive annular rings 100 on the outer surface 98 of the body 90 of the male portion 84 of the adjusting apparatus 30 extend from inward of the arm 96 of the proximal end 92 of the body 90 of the male portion 84 of the adjusting apparatus 30 to inward of the distal end 94 of the body 90 of the male portion 84 of the adjusting apparatus 30.

The adjusting apparatus 30 further comprises a spring-loaded button 102. The spring-loaded button 102 of the adjusting apparatus 30 extends radially outwardly through a through bore 104 in the distal end 94 of the body 90 of the male portion 84 of the adjusting apparatus 30 and cooperates with a selected one of the consecutive annular grooves 88 on the interior surface 86 of the female portion 82 of the adjusting apparatus 30 so as to allow the female portion 82 of the adjusting apparatus 30 to be length adjustable relative to the male portion 84 of the adjusting apparatus 30.

The adjusting apparatus 30 further comprises a flexible snap C-ring 106. The flexible snap C-ring 106 of the adjusting apparatus 30 engages between a selected adjacent pair of the consecutive annular rings 100 on the outer surface 98 of the body 90 of the male portion 84 of the adjusting apparatus 30 so as to provide a stop when the female portion 82 of the adjusting apparatus 30 has entered the male portion 84 of the adjusting apparatus 30 a desired amount.

The adjusting apparatus 30 further comprises a lock 108. The lock 108 of the adjusting apparatus 30 closes the proximal end 92 of the body 90 of the male portion 84 of the adjusting apparatus 30, and is operatively connected to the spring-loaded button 102 of the adjusting apparatus 30 so as to selectively lock the spring-loaded button 102 of the adjusting apparatus 30 in an extend position where it sits in the selected one of the consecutive annular grooves 88 on the interior surface 86 of the female portion 82 of the adjusting apparatus 30 and prevents undesired movement of the female portion 82 of the adjusting apparatus 30 relative to the male portion 84 of the adjusting apparatus 30.

It will be understood that each of the elements described above, or two or more together, may also find a useful application in other types of constructions differing from the types described above.

While the invention has been illustrated and described as embodied in a knockdown nerf bar for replaceably and adjustably protecting a side of a vehicle from dings and dents, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A knockdown nerf bar for replaceably and adjustably protecting a side of a vehicle from dings and dents, wherein the vehicle has an underside with a panel flange, said nerf bar comprising:
   a) a frame;
   b) mounting apparatus; and
   c) adjusting apparatus;
   wherein said frame is for replaceably and adjustably mounting to the vehicle;
   wherein said mounting apparatus is operatively connected to said frame;
   wherein said mounting apparatus is for mounting said frame to the vehicle; wherein said adjusting apparatus is operatively connected to said frame; and wherein said adjusting apparatus is for replaceably and adjustably attaching said frame to the vehicle, wherein said frame comprises a pair of subframes, wherein each subframe of said frame comprises a stationary portion; and
   wherein each subframe of said frame comprises a movable portion, wherein said movable portion of each subframe of said frame has an uppermost end;
   wherein said uppermost end of said movable portion of each subframe of said frame is open;
   wherein said movable portion of each subframe of said frame has a lowermost end; and
   wherein said movable portion of each subframe of said frame has a longitudinal surface, wherein said movable portion of each subframe of said frame has a plurality of slots, wherein said plurality of slots of said movable portion of each subframe of said frame are vertically-oriented;
   wherein said plurality of slots of said movable portion of each subframe of said frame are vertically spaced-apart from each other; and
   wherein said plurality of slots of said movable portion of each subframe of said frame extend through said longitudinal surface of said movable portion of an associated subframe of said frame.

2. The nerf bar as defined in claim 1, wherein said stationary portion of each subframe of said frame is for mounting to the underside of the vehicle by said mounting apparatus; and
   wherein said stationary portion of each subframe of said frame is for extending outwardly from the underside of the vehicle by said mounting apparatus.

3. The nerf bar as defined in claim 1, wherein said movable portion of each subframe of said frame is replaceably connected to said stationary portion of an associated subframes of said frame by said adjusting apparatus;
   wherein said movable portion of each subframe of said frame is adjustably connected to said stationary portion of said associated subframes of said frame by said adjusting apparatus; and
   wherein said movable portion of each subframe of said frame is for extending vertically along the side of the vehicle.

4. The nerf bar as defined in claim 1, wherein said stationary portion of each subframe of said frame is tubular; and
   wherein said stationary portion of each subframe of said frame is horizontally-oriented.

5. The nerf bar as defined in claim 1, wherein said movable portion of each subframe of said frame is tubular; and
   wherein said movable portion of each subframe of said frame is vertically-oriented.

6. The nerf bar as defined in claim 1, wherein said movable portion of each subframe of said frame has a cap.

7. The nerf bar as defined in claim 6, wherein said cap of said movable portion of each subframe of said frame replaceably closes said uppermost end of said movable portion of an associated subframe of said frame.

8. The nerf bar as defined in claim 1, wherein said frame comprises a plurality of transverse portions.

9. The nerf bar as defined in claim 8, wherein said plurality of transverse portions of said frame extend from one subframe of said frame to the other subframe of said frame; and
   wherein said plurality of transverse portions of said frame are for extending horizontally across the side of the vehicle.

10. The nerf bar as defined in claim 9, wherein each transverse portion of said frame is telescopically formed so as to be length adjustable.

11. The nerf bar as defined in claim 9, wherein each transverse portion of said frame has a pair of ends; and
wherein each end of each transverse portion of said frame has a through bore.

12. The nerf bar as defined in claim 11, wherein said through bore through each end of each transverse portion of said frame is vertically-oriented; and
wherein said through bore through each end of each transverse portion of said frame is vertically-aligned with said through bore through an adjacent end of said ends of said plurality of transverse portions of said frame.

13. The nerf bar as defined in claim 11, wherein each set of adjacent ends of said plurality of transverse portion of said frame are received in said plurality of slots in said movable portion of an associated subframe of said frame.

14. The nerf bar as defined in claim 11, wherein each set of adjacent ends of said plurality of transverse portion of said frame are maintained in said plurality of slots in said movable portion of an associated subframe of said frame by a rod.

15. The nerf bar as defined in claim 14, wherein said rod extends through said through bores in each associated set of adjacent ends of said plurality of transverse portions of said frame, once said plurality of transverse portions of said frame have been received in said plurality of slots in said movable portion of an associated subframe of said frame, by removing said cap of said movable portion of said associated subframe of said frame.

16. A knockdown nerf bar for replaceably and adjustably protecting a side of a vehicle from dings and dents, wherein the vehicle has an underside with a panel flange, said nerf bar comprising:
a) a frame;
b) mounting apparatus; and
c) adjusting apparatus;
wherein said frame is for replaceably and adjustably mounting to the vehicle;
wherein said mounting apparatus is operatively connected to said frame;
wherein said mounting apparatus is for mounting said frame to the vehicle;
wherein said adjusting apparatus is operatively connected to said frame; and
wherein said adjusting apparatus is for replaceably and adjustable attaching said frame to the vehicle, wherein said frame comprises a pair of subframes, wherein each subframe of said frame comprises a stationary portion; and
wherein each subframe of said frame comprises a movable portion, wherein said mounting apparatus comprises a bracket; and
wherein said mounting apparatus comprises a filler, wherein said bracket of said mounting apparatus comprises an outer portion; and
wherein said bracket of said mounting apparatus comprises an inner portion, wherein said outer portion of said bracket of said mounting apparatus has a generally U-shaped portion;
wherein said outer portion of said bracket of said mounting apparatus has a pair of primary flanges.

17. The nerf bar as defined in claim 16, wherein said pair of primary flanges of said outer portion of said bracket of said mounting apparatus extend outwardly from opposing sides of said generally U-shaped portion of said outer portion of said bracket of said mounting apparatus; and
wherein said pair of primary flanges of said outer portion of said bracket of said mounting apparatus are for attaching to the underside of the vehicle.

18. The nerf bar as defined in claim 16, wherein said stationary portion of an associated subframe of said frame is captured in said generally U-shaped portion of said outer portion of said bracket of said mounting apparatus and is topped off by said filler of said mounting apparatus for eliminating play between said stationary portion of an associated subframe of said frame and the underside of the vehicle.

19. The nerf bar as defined in claim 16, wherein said pair of primary flanges of said outer portion of said bracket of said mounting apparatus have through bores, respectively.

20. The nerf bar as defined in claim 19, wherein said through bores through said pair of primary flanges of said outer portion of said bracket of said mounting apparatus, respectively, receive screws, respectively; and
wherein said screws are for attaching said outer portion of said bracket of said mounting apparatus to the underside of the vehicle.

21. The nerf bar as defined in claim 16, wherein said outer portion of said bracket of said mounting apparatus has a pair of secondary flanges.

22. The nerf bar as defined in claim 21, wherein said pair of secondary flanges of said outer portion of said bracket of said mounting apparatus depend from said pair of primary flanges of said outer portion of said bracket of said mounting apparatus, respectively; and
wherein said pair of secondary flanges of said outer portion of said bracket of said mounting apparatus are for attaching to the panel flange of the underside of the vehicle.

23. The nerf bar as defined in claim 21, wherein said pair of secondary flanges of said outer portion of said bracket of said mounting apparatus have through bores, respectively.

24. The nerf bar as defined in claim 23, wherein said through bores through said pair of secondary flanges of said outer portion of said bracket of said mounting apparatus, respectively, receive bolts, respectively; and
wherein said bolts are for attaching said outer portion of said bracket of said mounting apparatus to the panel flange of the underside of the vehicle.

25. The nerf bar as defined in claim 24, wherein said inner portion of said bracket of said mounting apparatus has a main portion;
wherein said main portion of said inner portion of said bracket of said mounting apparatus are for attaching to the underside of the vehicle; and
wherein said inner portion of said bracket of said mounting apparatus has a pair of flanges.

26. The nerf bar as defined in claim 25, wherein said pair of flanges of said inner portion of said bracket of said mounting apparatus depend from opposing sides of said main portion of said inner portion of said bracket of said mounting apparatus; and
wherein said pair of flanges of said inner portion of said bracket of said mounting apparatus are for attaching to the panel flange of the underside of the vehicle.

27. The nerf bar as defined in claim 25, wherein said main portion of said inner portion of said bracket of said mounting apparatus has through bores.

28. The nerf bar as defined in claim 27, wherein said through bores through said main portion of said inner portion of said bracket of said mounting apparatus receive screws, respectively; and wherein said screws are for attaching said inner portion of said bracket of said mounting apparatus to the underside of the vehicle.

29. The nerf bar as defined in claim 27, wherein said pair of flanges of said inner portion of said bracket of said mounting apparatus have through bores, respectively.

30. The nerf bar as defined in claim 29, wherein said through bores through said pair of flanges of said inner portion of said bracket of said mounting apparatus, respectively, receive said bolts, respectively; and wherein said bolts are for attaching said inner portion of said bracket of said mounting apparatus to the panel flange of the underside of the vehicle, with the panel flange of the underside of the vehicle being sandwiched between said pair of flanges of said inner portion of said bracket of said mounting apparatus and said pair of secondary flanges of said outer portion of said bracket of said mounting apparatus.

31. The nerf bar as defined in claim 16, wherein said bracket of said mounting apparatus captures said stationary portion of an associated subframe of said frame; and wherein said bracket of said mounting apparatus is for attaching to the underside of the vehicle for affixing0 said stationary portion of an associated subframe of said frame to the underside of the vehicle.

32. A knockdown nerf bar for replaceably and adjustably protecting a side of a vehicle from dines and dents, wherein the vehicle has an underside with a panel flange, said nerf bar comprising:
a) a frame;
b) mounting apparatus; and
c) adjusting apparatus;
wherein said frame is for replaceable and adjustably mounting to the vehicle;
wherein said mounting apparatus is operatively connected to said frame;
wherein said mounting apparatus is for mounting said frame to the vehicle;
wherein said adjusting apparatus is operatively connected to said frame; and
wherein said adjusting apparatus is for replaceably and adjustable attaching said frame to the vehicle, wherein said frame comprises a pair of subframes, wherein each subframe of said frame comprises a stationary portion; and
wherein each subframe of said frame comprises a movable portion, wherein said adjusting apparatus comprises a female portion; and
wherein said adjusting apparatus comprises a male portion, wherein said female portion of said adjusting apparatus comprises said stationary portion of each subframe of said frame having an interior surface with consecutive annular grooves;
wherein said consecutive annular grooves extend longitudinally along said interior surface of said stationary portion of each subframe of said frame; and
wherein said consecutive annular grooves are longitudinally spaced-apart.

33. The nerf bar as defined in claim 32, wherein said male portion of said adjusting apparatus comprises a body.

34. The nerf bar as defined in claim 33, wherein said body of said male portion of said adjusting apparatus has a proximal end; and wherein said body of said male portion of said adjusting apparatus has a distal end.

35. The nerf bar as defined in claim 33, wherein said body of said male portion of said adjusting apparatus is tubular; and wherein said body of said male portion of said adjusting apparatus is horizontally-oriented.

36. The nerf bar as defined in claim 34, wherein said proximal end of said body of said male portion of said adjusting apparatus has an arm.

37. The nerf bar as defined in claim 36, wherein said arm of said proximal end of said body of said male portion of said adjusting apparatus extends vertically upwardly from said body of said male portion of said adjusting apparatus; and wherein said arm of said proximal end of said body of said male portion of said adjusting apparatus is replaceably received in said movable portion of an associated subframe of said frame.

38. The nerf bar as defined in claim 33, wherein said body of said male portion of said adjusting apparatus has an outer surface with consecutive annular rings;
wherein said consecutive annular rings extend longitudinally along said outer surface of said body of said male portion of said adjusting apparatus; and
wherein said consecutive annular rings are longitudinally spaced-apart.

39. The nerf bar as defined in claim 38, wherein said consecutive annular rings on said outer surface of said body of said male portion of said adjusting apparatus extend from inward of said arm of said proximal end of said body of said male portion of said adjusting apparatus to inward of said distal end of said body of said male portion of said adjusting apparatus.

40. The nerf bar as defined in claim 34, wherein said adjusting apparatus comprises a spring-loaded button.

41. The nerf bar as defined in claim 40, wherein said spring-loaded button of the adjusting apparatus extends radially outwardly through a through bore in said distal end of said body of said male portion of said adjusting apparatus; and wherein said spring-loaded button of the adjusting apparatus cooperates with a selected one of said consecutive annular grooves on said interior surface of said female portion of said adjusting apparatus so as to allow said female portion of said adjusting apparatus to be length adjustable relative to said male portion of said adjusting apparatus.

42. The nerf bar as defined in claim 38, wherein said adjusting apparatus comprises a flexible snap C-ring.

43. The nerf bar as defined in claim 42, wherein said flexible snap C-ring of said adjusting apparatus engages between a selected adjacent pair of said consecutive annular rings on said outer surface of said body of said male portion of said adjusting apparatus so as to provide a stop when said female portion of said adjusting apparatus has entered said male portion of said adjusting apparatus a desired amount.

44. The nerf bar as defined in claim 40, wherein said adjusting apparatus comprises a lock.

45. The nerf bar as defined in claim 44, wherein said lock of said adjusting apparatus closes said proximal end of said body of said male portion of said adjusting apparatus; and wherein said lock of said adjusting apparatus is operatively connected to said spring-loaded button of said adjusting apparatus so as to selectively lock said spring-loaded button of said adjusting apparatus in an extend position where it sits in said selected one of said consecutive annular grooves on said interior surface of said female portion of said adjusting apparatus and prevents undesired movement of said female portion of said adjusting apparatus relative to said male portion of said adjusting apparatus.

* * * * *